United States Patent
Cheng et al.

(10) Patent No.: US 11,606,836 B2
(45) Date of Patent: Mar. 14, 2023

(54) CONFIGURING DISCONTINUOUS RECEPTION (DRX) PARAMETERS FOR SIDELINK COMMUNICATIONS

(71) Applicant: QUALCOMM Incorporated, San Diego, CA (US)

(72) Inventors: Hong Cheng, Basking Ridge, NJ (US); Qing Li, Princeton Junction, NJ (US); Junyi Li, Fairless Hills, PA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/315,219

(22) Filed: May 7, 2021

(65) Prior Publication Data

US 2022/0361280 A1 Nov. 10, 2022

(51) Int. Cl.
*H04W 4/00* (2018.01)
*H04W 76/28* (2018.01)
(Continued)

(52) U.S. Cl.
CPC ............ *H04W 76/28* (2018.02); *H04W 76/11* (2018.02); *H04W 92/18* (2013.01)

(58) Field of Classification Search
CPC ...... H04W 76/28; H04W 76/11; H04W 92/18
(Continued)

(56) References Cited

U.S. PATENT DOCUMENTS

2014/0269534 A1* 9/2014 Persson ................. H04W 16/14
370/329
2019/0174411 A1* 6/2019 Xu ..................... H04W 72/0406
(Continued)

FOREIGN PATENT DOCUMENTS

| WO | 2018084796 A1 | 5/2018 |
| WO | 2019033407 A1 | 2/2019 |
| WO | 2021060786 A1 | 4/2021 |

OTHER PUBLICATIONS

Huawei et al., "Further Views on Rel-17 Work Area on NR Sidelink Enhancements for V2X and other Use Cases", 3GPP TSG RAN Meeting #85, RP-191831, 3rd Generation Partnership Project, Mobile Competence Centre, 650, Route Des Lucioles, F-06921 Sophia-Antipolis Cedex, France, vol. TSG RAN No. Newport Beach USA, Sep. 16, 2019-Sep. 20, 2019, Sep. 9, 2019, XP051782380, 13 Pages, pp. 4-8, p. 5, Paragraph 2.1.2.3, Section 2.2.2, Figure 9.
(Continued)

*Primary Examiner* — Chuong T Ho
(74) *Attorney, Agent, or Firm* — Patterson & Sheridan, LLP

(57) ABSTRACT

Certain aspects of the present disclosure provide techniques for configuring discontinuous reception on a sidelink connection between a remote user equipment (UE) and a relay UE. An example method generally includes determining a configuration for sidelink discontinuous reception (DRX) communications between the relay UE and a first remote UE, the configuration including a transmission configuration for communications from the relay UE to the first remote UE and a reception configuration for communications from the first remote UE to the relay UE; transmitting, to the first remote UE, a configuration message indicating the configuration for sidelink DRX communications between the relay UE and the first remote UE; and communicating with the first remote UE via a sidelink channel based on the configuration.

28 Claims, 8 Drawing Sheets

(51) Int. Cl.
*H04W 76/11* (2018.01)
*H04W 92/18* (2009.01)

(58) Field of Classification Search
USPC .......................................... 370/329, 330, 328
See application file for complete search history.

(56) References Cited

U.S. PATENT DOCUMENTS

| | | | |
|---|---|---|---|
| 2021/0059005 A1* | 2/2021 | Hosseini | H04W 48/16 |
| 2021/0212099 A1* | 7/2021 | Yi | H04W 72/042 |
| 2021/0297842 A1* | 9/2021 | Shrivastava | H04W 28/24 |
| 2021/0329510 A1* | 10/2021 | Tseng | H04W 36/0079 |
| 2021/0410214 A1* | 12/2021 | Kuo | H04W 76/14 |
| 2021/0410215 A1* | 12/2021 | Kuo | H04W 76/14 |
| 2022/0086931 A1* | 3/2022 | Tenny | H04W 88/04 |
| 2022/0095411 A1* | 3/2022 | Lin | H04W 80/02 |
| 2022/0124489 A1* | 4/2022 | Lu | H04W 12/04 |
| 2022/0159753 A1* | 5/2022 | Kuo | H04W 76/14 |
| 2022/0201790 A1* | 6/2022 | Jung | H04W 76/19 |
| 2022/0210739 A1* | 6/2022 | Yi | H04L 5/0037 |
| 2022/0232408 A1* | 7/2022 | Lee | H04W 24/10 |
| 2022/0256625 A1* | 8/2022 | Park | H04W 76/40 |
| 2022/0272507 A1* | 8/2022 | Park | H04W 4/70 |

OTHER PUBLICATIONS

Intel Corporation et al., "DRX in Side Link", 3GPP TSG RAN WG2 Meeting #96, R2-167764, 3rd Generation Partnership Project, Mobile Competence Centre, 650, Route Des Lucioles, F-06921 Sophia-Antipolis Cedex, France, vol. RAN WG2, No. Reno, USA, Nov. 14, 2016-Nov. 18, 2016 Nov. 5, 2016, XP051192833, 2 Pages.
International Search Report and Written Opinion—PCT/US2022/070790—ISA/EPO—dated Aug. 8, 2022.

* cited by examiner

CONFIGURING DISCONTINUOUS RECEPTION (DRX) PARAMETERS FOR SIDELINK COMMUNICATIONS

INTRODUCTION

Aspects of the present disclosure relate to wireless communications, and more particularly, to techniques for configuring discontinuous reception (DRX) on a sidelink connection between a relay user equipment (UE) and a remote UE.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment. The method generally includes determining a configuration for sidelink discontinuous reception (DRX) communications between the relay UE and a first remote UE, the configuration including a transmission configuration for communications from the relay UE to the first remote UE and a reception configuration for communications from the first remote UE to the relay UE; transmitting, to the first remote UE, a configuration message indicating the configuration for sidelink DRX communications between the relay UE and the first remote UE; and communicating with the first remote UE via a sidelink channel based on the configuration.

One aspect provides a method for wireless communications by a user equipment. The method generally includes receiving, from a relay UE, a configuration message indicating a configuration for sidelink discontinuous reception (DRX) communications between the remote UE and the relay UE, the configuration including a reception configuration for communications from the relay UE to the remote UE and a transmission configuration for communications from the remote UE to the relay UE; and communicating with the relay UE via a sidelink channel based on the configuration.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
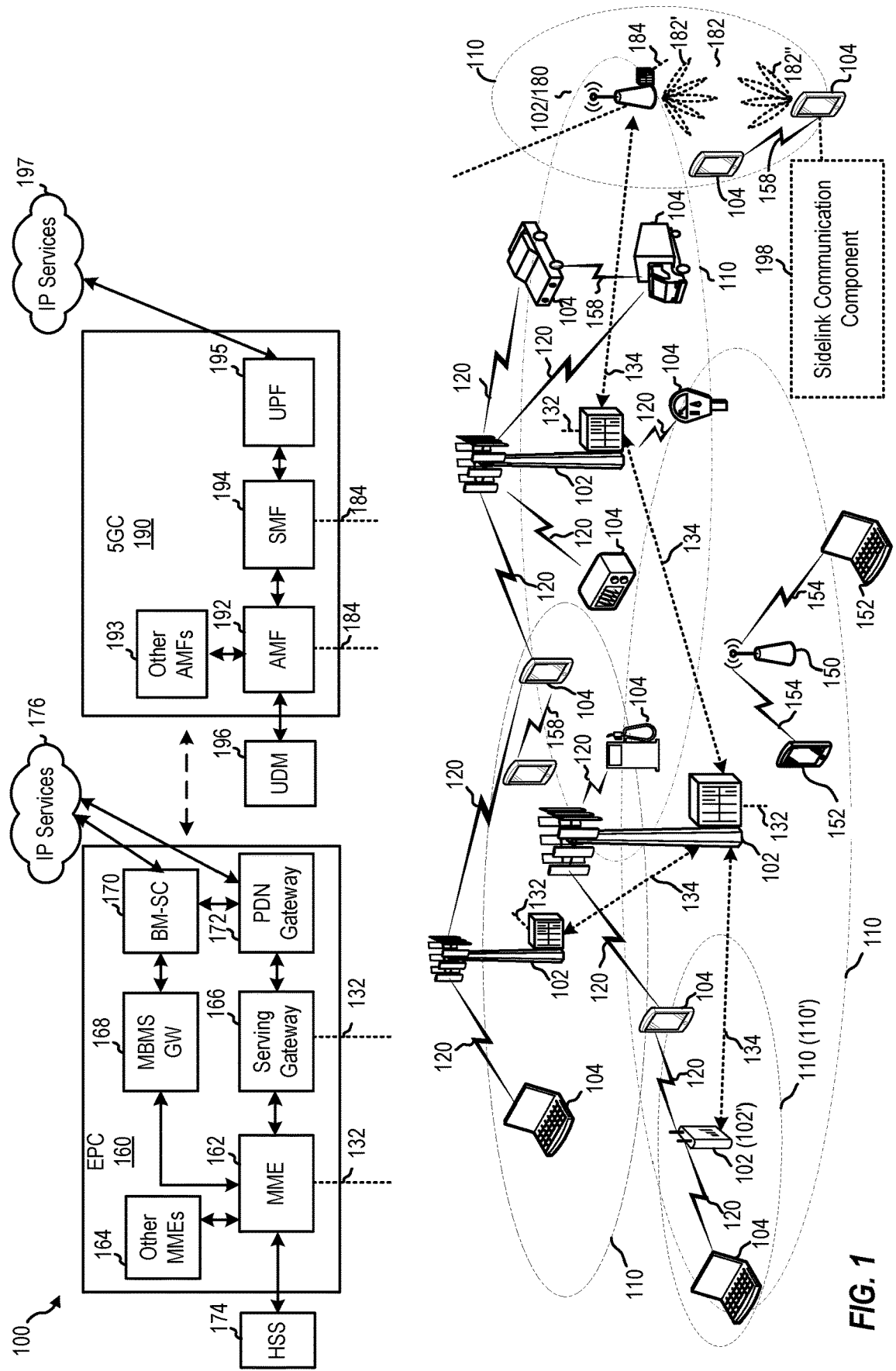
FIG. 1 is a block diagram conceptually illustrating an example wireless communication network.

Aspects of the present disclosure provide apparatuses, methods, processing systems, and computer-readable mediums for configuring discontinuous reception on a sidelink connection between a relay user equipment (UE) and a remote UE.

In wireless communication systems, discontinuous reception (DRX) may be scheduled between different user equipments (UEs) on a sidelink channel between these UEs. Discontinuous reception may be configured as a set of directional operations between the same pair of UEs, such that a first operation corresponds to a first UE as a source UE and a second UE as a destination UE and a second operation corresponds to the second UE as a source UE and the first UE as a destination UE. Because discontinuous reception may be configured as a set of directional operations, configuring discontinuous reception between two UEs may entail multiple rounds of negotiation and configuration. This, however, may impose a signaling overhead for handling configuration of discontinuous reception between different UEs and cause delays in preparing the link for sidelink communications. Further, when one UE serves as a relay UE for multiple remote UEs, the relay UE may need to manage multiple unicast links and interact with the multiple remote UEs using these multiple unicast links. Therefore, controlling both the transmission configuration as well as the reception configuration separately by a relay UE may not be practical.

Aspects of the present disclosure provide techniques for configuring discontinuous reception for both directions for the sidelink between the remote UEs and the relay UE by the relay UE. Generally, as discussed herein, a configuration determined for a remote UE by the relay UE may be communicated to the remote UE with an indication that the configuration is from a relay and includes a transmission configuration and reception configuration identified by the relay UE. Based on the indication that the configuration is from a relay UE, the remote UE can use the configuration information to determine when and how to transmit data to the relay UE and to determine when the remote UE can expect transmissions from the remote UE. By doing so, the relay UE can control discontinuous reception configurations for remote UEs and reduce the signaling overhead entailed in sidelink discontinuous reception configuration.

By determining DRX configuration for the sidelink communications at a relay UE and informing the remote UEs to use the configuration, aspects of the present disclosure allow for a relay UE to serve multiple remote UEs while minimizing the overhead needed to determine a DRX configuration for the remote UEs. As additional remote UEs connect to the relay UE, and as connections change between the relay UE and a network entity, the relay UE may adjust a configuration and signal the adjusted configuration to the remote UEs without a multi-round negotiation between the relay UE and each of the remote UEs. Thus, aspects of the present disclosure may reduce the signaling overhead for configuring sidelink discontinuous reception, which may accelerate the process of configuring sidelink discontinuous reception, reduce the power used in configuring sidelink discontinuous reception, and improve battery life for the relay UE and the remote UEs.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes sidelink communication component 198, which may be configured to configure discontinuous reception for sidelink communications between a relay UE and a remote UE.

Figure 2:
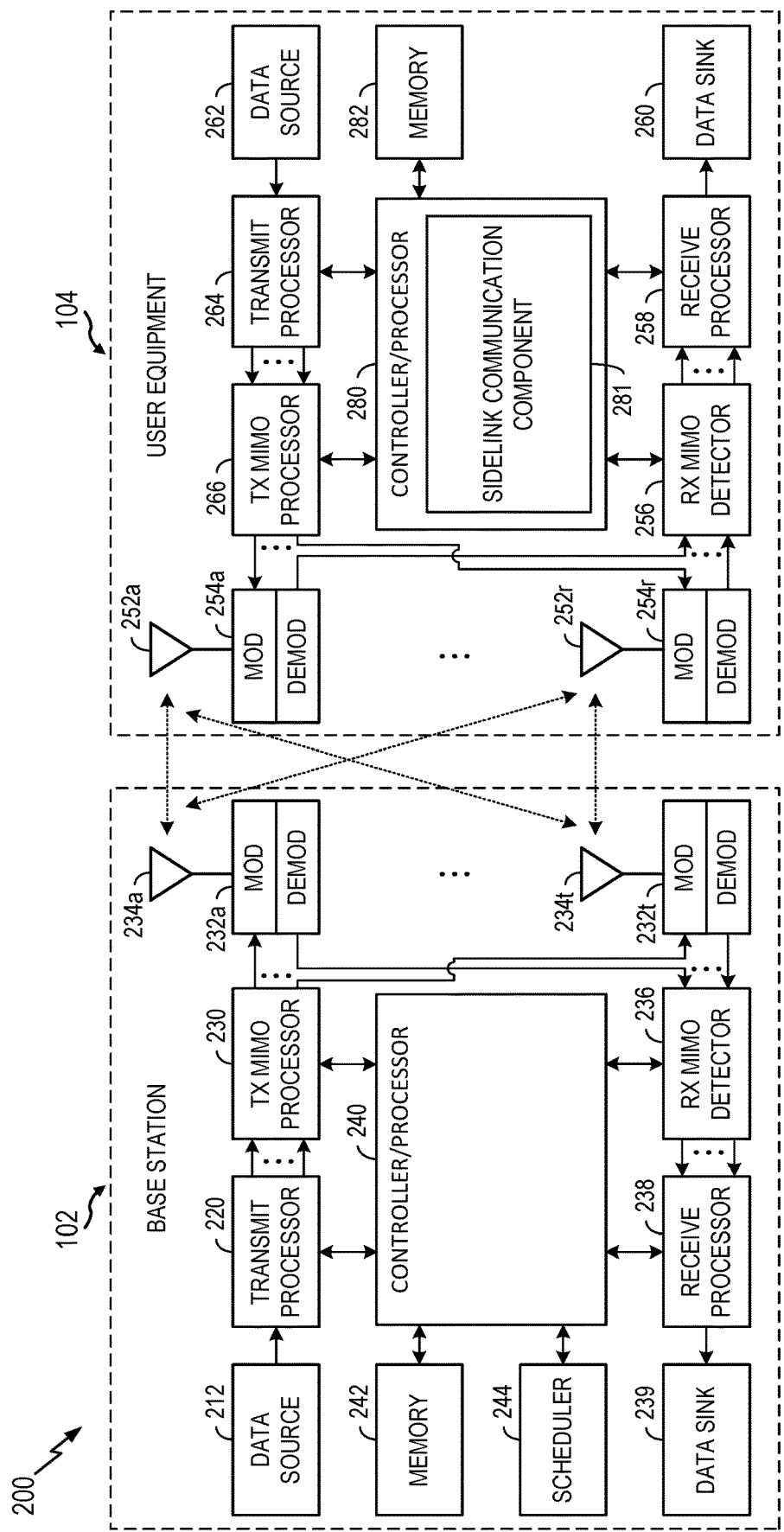
FIG. 2 is a block diagram conceptually illustrating aspects of an example base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes sidelink communication component 281, which may be representative of sidelink communication component 198 of FIG. 1. Notably, while depicted as an aspect of controller/processor 280, sidelink communication component 281 may be implemented additionally or alternatively in various other aspects of user equipment 104 in other implementations.

Figure 3:
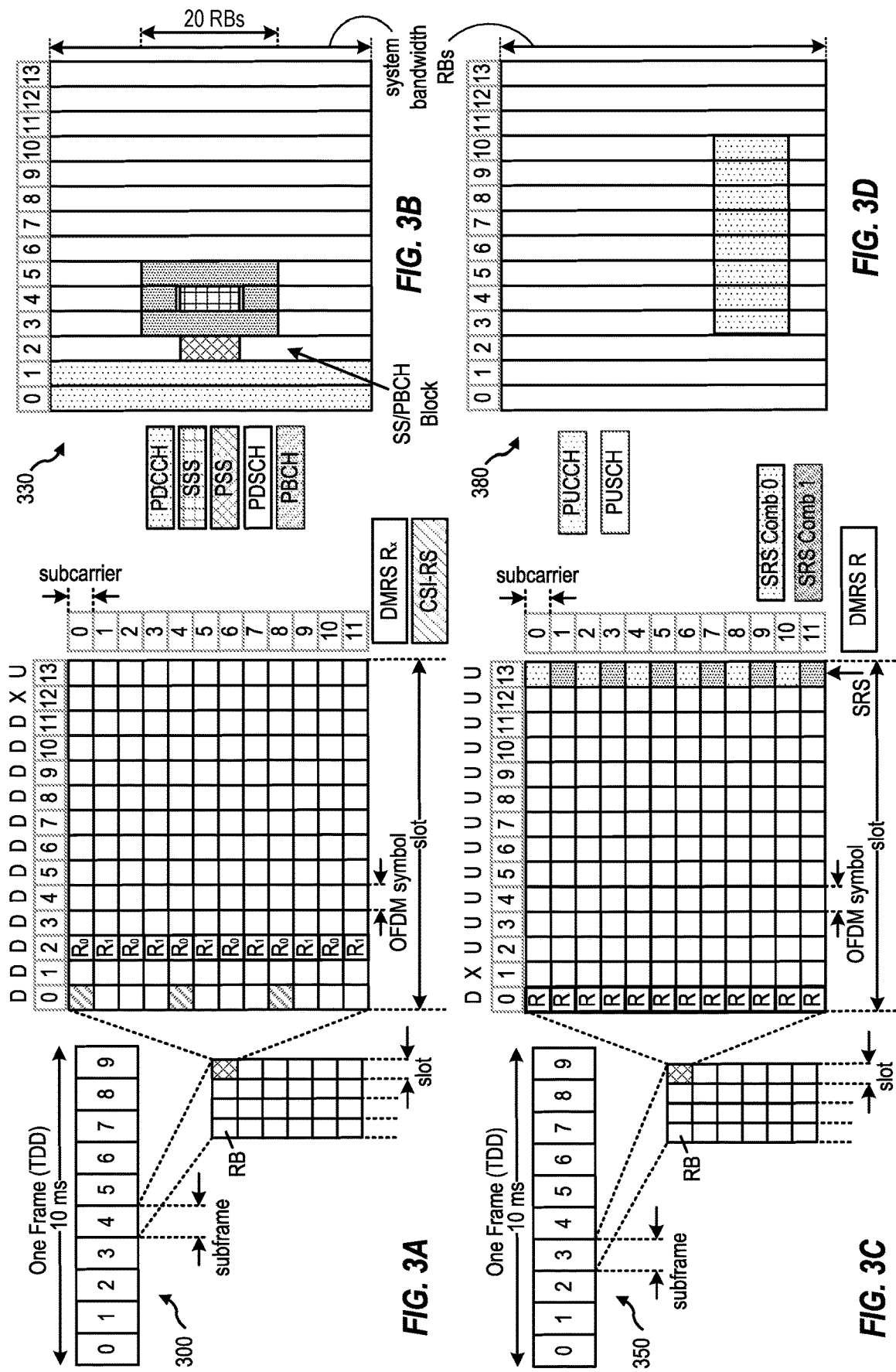
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Sidelink Communications

In a wireless communications network, communications may be performed by scheduling entities that schedule communications by entities in the wireless communications network and subordinate entities that communicate according to scheduling information provided by the scheduling entities. Within the wireless communications network, the subordinate entities may also communicate with each other using a sidelink signal, which may refer to a signal communicated from one subordinate entity (e.g., a first UE) to another subordinate entity (e.g., a second UE) without relaying that communication through a scheduling entity (e.g., UE or BS), even though a scheduling entity may be utilized for scheduling and/or control purposes. In some examples, the sidelink signals may be communicated using a licensed spectrum (unlike wireless local area networks (WLANs), which typically use an unlicensed spectrum). Real-world applications of such sidelink communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications.

Within a wireless communications system, a Uu path (cellular link) may be used for communications between a network entity (e.g., a gNodeB) and a user equipment. A PC5 path (sidelink), meanwhile, may be used for communications between UEs in a wireless network.

Figure 4:
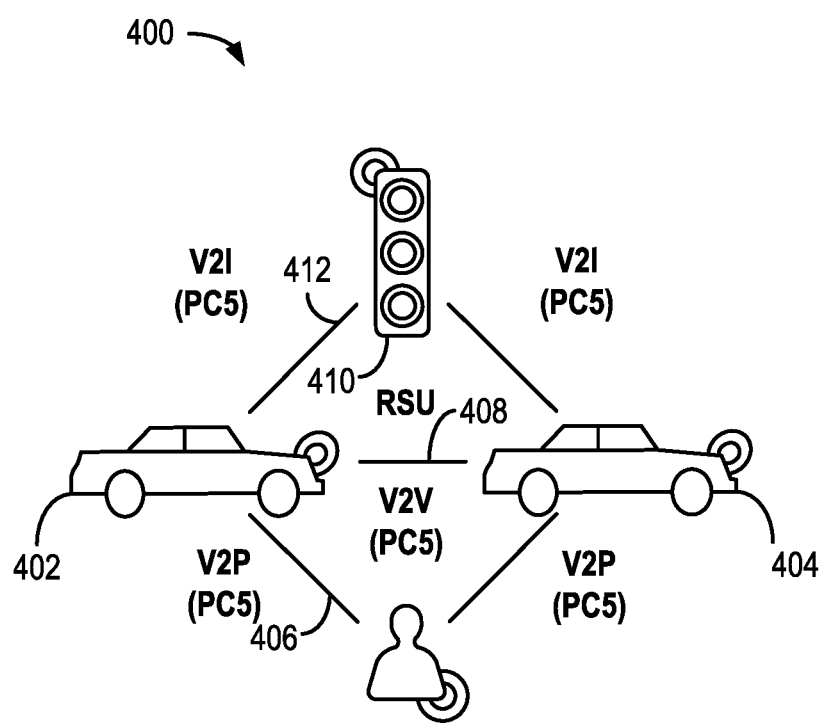
FIG. 4 shows a diagrammatic representation of an example vehicle to everything (V2X) systems in which communications via a sidelink channel may be performed.

FIG. 4 shows a diagrammatic representations of example of using sidelink communications in a vehicle to everything (V2X) system. For example, the vehicles shown in FIG. 4 may communicate via sidelink channels using the resource allocation and power control techniques described herein. It should be recognized that while FIG. 4 illustrates sidelink communications in the context of V2X systems, sidelink communications may be performed between various types of UEs, including, but not limited to, vehicle UEs and other UEs that may exist within a V2X system.

The V2X system illustrated in FIG. 4 provides a transmission mode involving direct sidelink communications between participants in proximity to one another in a local area. V2X system 400 (for example, including vehicle-to-vehicle (V2V) communications on a sidelink connection) is illustrated with two vehicles 402, 404. This transmission mode allows for direct communication (e.g., on a sidelink connection) between different participants in a given geographic location. As illustrated, a vehicle can have a wireless communication link 406 with an individual (i.e., vehicle to person (V2P), for example, via a UE) through a PC5 (sidelink) interface. Communications between the vehicles 402 and 404 may also occur through a PC5 (sidelink) interface 408. In a like manner, communication may occur from a vehicle 402 to other highway components (for example, roadside service unit 410), such as a traffic signal or sign (i.e., vehicle to infrastructure (V2I)) through a PC5 (sidelink) interface 412. With respect to each communication link illustrated in FIG. 4, two-way communication may take place between elements, therefore each element may be a transmitter and a receiver of information. The V2X system 400 may be a self-managed system implemented without assistance from a network entity in which resources for communications on sidelink channels may be scheduled autonomously using the techniques described herein. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

Aspects Related to Configuring Discontinuous Reception on a Sidelink Connection Between a Relay User Equipment (UE) and a Remote UE In sidelink communications, UEs can be configured to communicate using discontinuous reception (DRX) in which a transmitting UE and a receiving UE can perform transmissions during defined phases or time windows. In sidelink discontinuous reception, operations may be defined directionally such that a discontinuous reception configuration between a first UE and a second UE includes a first configuration for transmissions from the first UE to the second UE and a second configuration for discontinuous reception for transmissions from the second UE to the first UE. Generally, access stratum layer configuration signaling from the first UE to the second UE may be different from the access stratum layer configuration from the second UE to the first UE.

Figure 5:
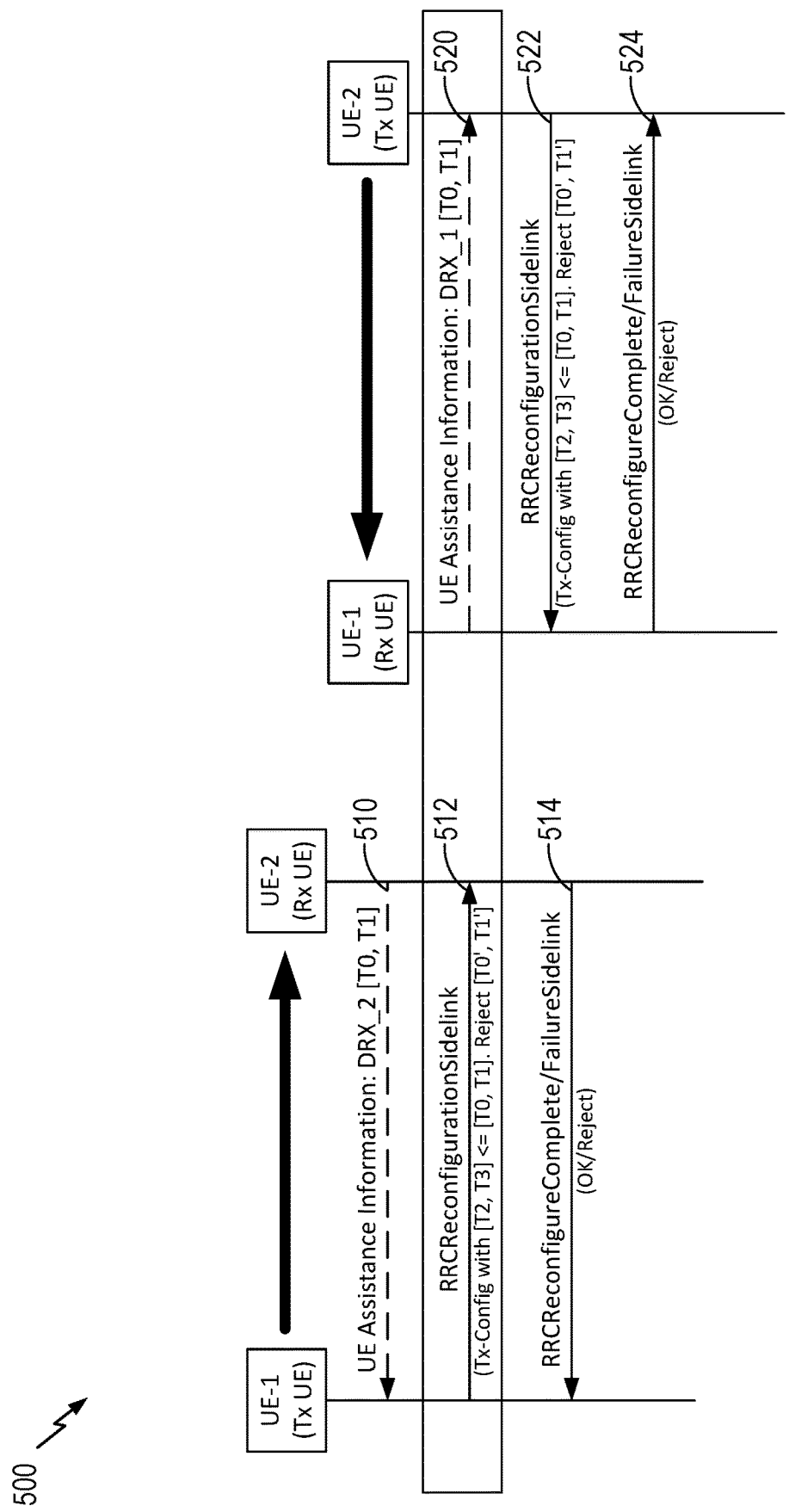
FIG. 5 depicts an example of messages exchanged between a first user equipment (UE) and a second UE to configure the first and second UEs for unicast discontinuous reception on a sidelink channel.

FIG. 5 depicts an example of messages exchanged between a first user equipment (UE) and a second UE to configure the first and second UEs for unicast discontinuous reception on a sidelink channel. As illustrated, to configure sidelink discontinuous reception, two round trips of signaling may be used. In a first set of signaling used to configure a unicast link between UE-1 and UE-2, UE-2 (e.g., the receiving UE on the unicast link for communications directed from UE-1 to UE-2) may first transmit a UE assistance information 510 to UE-1 including information that UE-1 can use to determine a configuration for discontinuous reception on the UE-1-to-UE-2 unicast link. UE-1 can then transmit an RRCReconfigurationSidelink message 512 including the DRX configuration from the transmission configuration perspective for the communications in the direction from UE-1 to UE-2 over the unicast link between UE-1 and UE-2. In response, UE-2 can indicate acceptance or rejection of the DRX configuration from the transmission configuration perspective in message 514. Acceptance of the transmission configuration may be carried, for example, in an RRCReconfigureComplete message, while rejection of the transmission configuration may be carried, for example, in an RRCFailureSidelink message.

Similarly, to configure communications from UE-2 to UE-1 over the same unicast link, where UE-1 is the receiving UE on over the unicast link, UE-1 can transmit UE assistance information 520 to UE-2 including information that UE-2 can use to determine a configuration for discontinuous reception on the direction from UE-2 to UE-1 over the unicast link. UE-2 can then transmit an RRCReconfigurationSidelink message 522 including the DRX configuration from the transmission configuration perspective for the communications in the direction from UE-2 to UE-1 over the unicast link. In response, UE-1 can indicate acceptance or rejection of the transmission configuration in message 524.

As discussed, the negotiation-based scheme illustrated in FIG. 5 above may not be suitable for a scenario in which one of the UEs on the sidelink is a relay UE that facilitates communications between a network entity and remote UEs connected with the relay UE. In a sidelink relay scenario, the relay UE may serve multiple remote UEs and may also have a Uu connection with the network entity. Because the relay UE may need to manage connections between multiple UEs and the network entity, it may not be feasible for the relay UE to allow remote UEs to control a discontinuous reception configuration for transmissions from a remote UE to the relay UE. Thus, the relay UE may need to control both its transmission configuration and its reception configuration with respect to a given remote UE. Further, as new remote UEs connect to the relay UE, or as Uu connection scheduling changes, the relay UE may need to adjust sidelink communication configurations with the remote UEs. However, in the negotiation-based scheme illustrated in FIG. 5 above, scenarios may exist where a remote UE rejects an updated configuration, which may break a connection between the remote UE and the relay UE. Similar considerations may also apply to the scenarios in which a group of UEs includes a designated group leader UEs, where the designated group leader UE maintains multiple unicast connections with other UEs in the group. Such a scenario may include, for example, a V2X platoon in which a V2X leader UE controls the operations of other member V2X UEs over the unicast connections between the V2X leader and the other member V2X UEs.

Thus, techniques are needed for sidelink discontinuous reception configuration that allows the relay UE to configure discontinuous reception for remote UEs connected with the relay UE.

Figure 6:
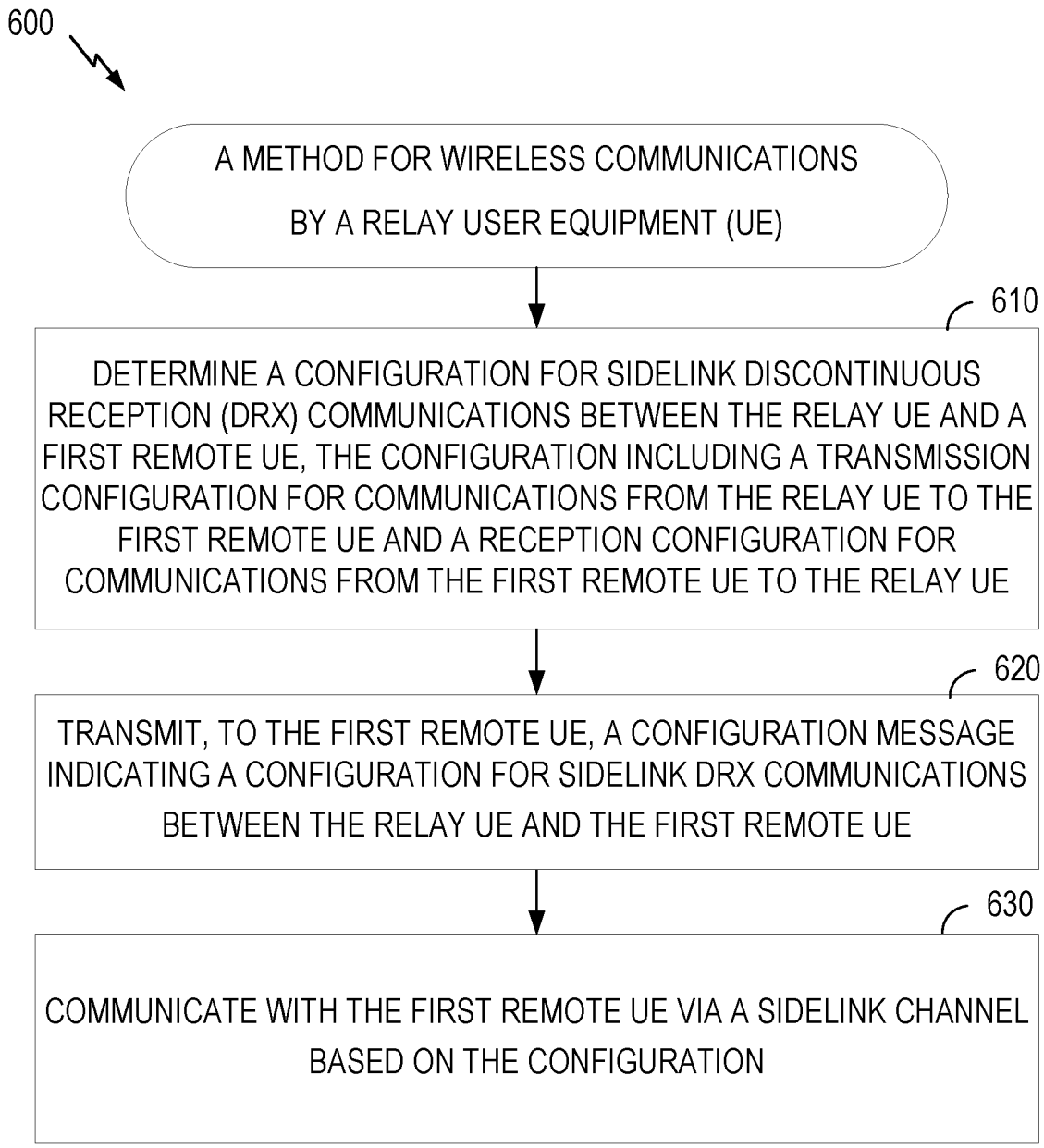
FIG. 6 depicts example operations that may be performed by a user equipment for sidelink discontinuous reception (DRX) communications in a wireless communication system.

FIG. 6 illustrates example operations 600 that may be performed by a relay user equipment (UE) to perform sidelink communications using a discontinuous reception (DRX) configuration, according to aspects of the present disclosure. Operations 600 may be performed, for example, by sidelink communication component 198 or sidelink communication component 281 illustrated in FIG. 1 or 2.

As illustrated, operations 600 begin at block 610, where the relay UE determines a configuration for sidelink discontinuous reception (DRX) communications between the relay UE and a first remote UE. The configuration may include a DRX configuration from the transmission configuration perspective for communications from the relay UE to the first remote UE and a DRX configuration from the reception configuration perspective for communications from the first remote UE to the relay UE. In some aspects, the reception configuration for communications from the first remote UE to the relay UE may be a transmission configuration for the first remote UE that causes the relay UE to expect reception of transmissions from the first remote UE at a time determined by the relay UE. By determining both the transmission configuration for communications from the relay UE to the first remote UE and the reception configuration for communications from the first remote UE to the relay UE, the relay UE can determine the transmission configuration for both unicast links established between the relay UE and the remote UE, which may reduce the signaling overhead need to configure discontinuous reception for a sidelink connection between the relay UE and the remote UE.

Generally, the relay UE can determine the configuration for sidelink DRX communications based, at least in part, on UE assistance information signaled to the relay UE by the first remote UE. In some aspects, the relay UE can determine the configuration for sidelink DRX communications based on traffic and quality of service (QoS) flow information associated with the first remote UE. The traffic and QoS flow information for the first remote UE may be determined, for example, based on historical information for the connection between the relay UE and the first remote UE, based on information about the first remote UE provided to the relay UE by a network entity, or the like. The remote UE may also provide such QoS flow information or expected traffic pattern information to the relay UE during procedures for establishing a unicast sidelink connection between the relay UE and the remote UE. The QoS flow information and/or expected traffic pattern information may be updated by the remote UE by signaling updates to the relay UE, for example, via the PC5-S or PC5-RRC signaling protocols during the lifetime of the unicast sidelink connection between the relay UE and the remote UE.

At block 620, the relay UE transmits, to the first remote UE, a configuration message. The configuration message indicates a configuration for sidelink DRX communications between the relay UE and the first remote UE. In some aspects, the configuration message may further include an indication that the indicated configuration for sidelink DRX communications is a configuration determined by a relay UE. Based on this indication, as discussed above, the first remote UE may accept the configuration without attempting to negotiate a configuration for sidelink communications from the first remote UE to the relay UE.

In some aspects, the configuration message may be a discontinuous reception (DRX) configuration message. The DRX configuration message may indicate that the configuration information is for discontinuous reception between the relay UE and the first remote UE. In some aspects, this DRX configuration message can be a PC5-S signaling message, or a PC5-RRC message.

At block 630, the relay UE communicates with the first remote UE via a sidelink channel based on the configuration for sidelink DRX communications between the relay UE and the first remote UE.

In some aspects, the relay UE may determine a second configuration for sidelink DRX communications. The second configuration for sidelink DRX communications may be a configuration for sidelink DRX communications between the relay UE and a second remote UE and may comprise a second discontinuous reception (DRX) period. In some aspects, this configuration may also include second DRX cycle information, which may be distinct from first DRX cycle information associated with the connection between the relay UE and the first remote UE. In some aspects, the second DRX period may be distinct from a first DRX period associated with the configuration for sidelink DRX communications between the relay UE and the first remote UE. The second DRX period may be indicated to the first remote UE as an overflow DRX period that can be used for communications between the relay UE and the first remote UE. Thus, the second DRX period may be used for communications between the relay UE and the first remote UE when the length of a transmission between the relay UE and the first remote UE exceeds the first DRX period and a priority of the transmission exceeds a priority level threshold. The priority level threshold can be configured on the remote UE by the relay UE via PC5-S or PC5-RRC signaling, or may be preconfigured on the remote UE.

When a connection is terminated between the relay UE and the second remote UE, the relay UE can revoke the second DRX period. The relay UE may thus indicate, to the first remote UE, that the overflow DRX period associated with the second DRX period is revoked, without affecting the DRX configuration allocated for the connection between the relay UE and the first remote UE. In some aspects, the relay UE can signal revocation of the second DRX period to the first remote UE via a sidelink radio resource control (RRC) message.

In some aspects, the first remote UE may be a member of a group of UEs. Because the sidelink DRX configuration may be a one-way configuration (e.g., determined by the relay UE and provided to the remote UEs by the relay UE), the relay UE may not expect feedback from individual remote UEs. The configuration message transmitted to the first remote UE may thus be a configuration message associated with the group of UEs and may be transmitted to the group of UEs via groupcast messaging over the sidelink.

In some aspects, the relay UE may configure the remote UEs with a group identifier and may assign a temporary identifier for each remote UE in the group of UEs. The relay UE may also configure the remote UEs in the group with a groupcast security key during the initial unicast link establishment (e.g., in sidelink PC5-S signaling). Because different remote UEs in the group of UEs may have different main and secondary DRX configurations, the temporary identifier for a remote UE may be used both to signal adjustments to a configuration for a specific remote UE in the group of UEs and to conceal an actual identifier associated with the remote UE. To signal configuration information for a specific remote UE in the group of UEs, the relay UE can include the temporary identifier for that specific remote UE in a groupcast configuration message. The UEs in the group can examine the identifiers included in the groupcast configuration message to determine whether the groupcast configuration message is applicable to the UE and can discard the groupcast configuration message if the UE determines that the message is not applicable to or intended for the UE.

In some aspects, a sidelink connection between the relay UE and a remote UE may be a Layer 2 (L2) UE-to-Network Relay connection. In such a case, the relay UE and the remote UE may be in RRC CONNECTED mode and may be managed by a same network entity. Thus, the DRX configuration of each sidelink connection between the relay UE and the remote UE may be centrally managed by the network entity. To support L2 relay connections, the relay UE may be configured by the network entity with information for each remote UE connected with the relay UE. For example, an RRCReconfiguration message for a Uu connection between the relay UE and the network entity may include the DRX configuration for a sidelink connection between the relay UE and the remote UE. For example, the DRX configuration for the sidelink connection between the relay UE and the remote UE may be carried in a container included in the RRC reconfiguration message, such as a PC5-DRX container included in a Uu RRCReconfiguration message. The relay UE can unpack the container in the RRCReconfiguration message and forward the PC5-DRX container for the sidelink connection between the relay UE and the remote UE to the remote UE to control the sidelink connection.

Figure 7:
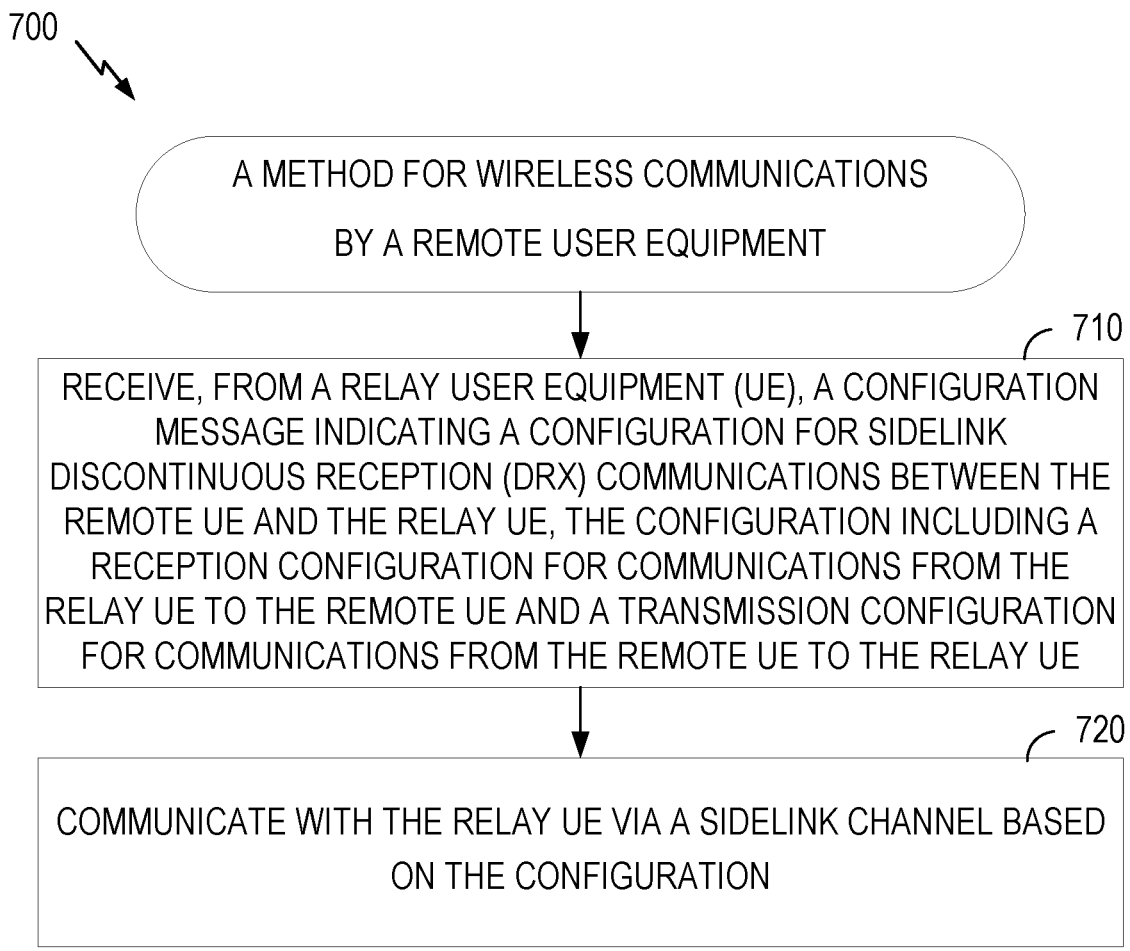
FIG. 7 depicts example operations that may be performed by a user equipment for sidelink discontinuous reception (DRX) communications in a wireless communication system.

FIG. 7 illustrates example operations that may be performed by a remote UE to communicate with a relay UE using a discontinuous reception (DRX) configuration determined by the relay UE, according to aspects of the present disclosure. Operations 700 may be performed, for example, by sidelink communication component 198 or sidelink communication component 281 illustrated in FIG. 1 or 2.

As illustrated, operations 700 begin at block 710, where the remote UE receives, from a relay UE, a configuration message. The configuration message generally indicates a configuration for sidelink DRX communications between the remote UE and the relay UE. The configuration may include a reception configuration for communications from the relay UE to the remote UE and a transmission configuration for communications from the remote UE to the relay UE.

As discussed, in some aspects, the configuration message may include an indication that the configuration is determined by the relay UE for both transmission and reception at the relay UE. Based on this indication, the remote UE can accept the configuration without attempting to negotiate a configuration with the relay UE, which allows the relay UE to control a configuration for sidelink DRX communications between the relay UE and the remote UE. The configuration message may, in some aspects, be a discontinuous reception message.

At block 720, the remote UE communicates with the relay UE based on the configuration.

In some aspects, the remote UE can receive information indicating a second DRX period serving as an overflow DRX period for communications between the relay UE and the remote UE. The remote UE can use the second DRX period for communications when communications cannot be successfully performed in a first DRX period associated with the configuration for sidelink DRX communications between the remote UE and the relay UE. In some aspects, the second DRX period may be associated with a priority level for use in determining when communications can be performed using the second DRX period. Communications with a priority level exceeding the priority level associated with the second DRX period can be performed during the second DRX period, while communications with a priority level that does not exceed the priority level associated with the second DRX period can be deferred until the next instance of the first DRX period.

At some later point in time, the remote UE may receive, from the relay UE, an indication that the overflow period associated with the second DRX period is revoked. Based on this revocation, the remote UE can communicate with the relay UE during the first DRX period, but not during the second DRX period.

In some aspects, the remote UE can receive the configuration message via groupcast signaling directed to a group of UEs including the remote UE. The configuration message may include a temporary identifier associated with the remote UE to indicate that the remote UE is the intended recipient of the configuration message. Based on determining that the temporary identifier included in the configuration message matches a temporary identifier assigned by the relay UE to the remote UE, the remote UE can configure itself based on the configuration included in the configuration message. In some aspects, where the temporary identifier included in the configuration message is not the temporary identifier assigned to the remote UE, the remote UE can discard the configuration message.

In some aspects, the remote UE and the relay UE may be connected using an L2 relay and connected with a same network entity in RRC connected mode. As discussed, because both the remote UE and the relay UE may be connected with the same network entity in RRC connected mode, the network entity may control the sidelink configuration for the connection between the remote UE and the relay UE. For example, the configuration message received by the remote UE may be a container in an RRC reconfiguration message forwarded from the network entity to the remote UE via the relay UE.

The sidelink configuration techniques discussed herein may be used in various scenarios. For example, the sidelink configuration techniques discussed herein may be used in a platooning deployment where a platoon of UEs includes a leader, where the leader maintains a unicast link with each member in the platoon. In another example, the sidelink configuration techniques discussed herein may be used in roadside unit (RSU) use cases where an RSU communicates with multiple UEs using unicast links between the RSUs and each UE. In such a case, the UEs may provide sensor information to the RSU for the RSU to distribute to other UEs with which a unicast link is maintained. In another case, the RSU may communicate with each of the multiple UEs to facilitate coordinated driving by the multiple UEs.

Example Wireless Communication Devices

Figure 8:
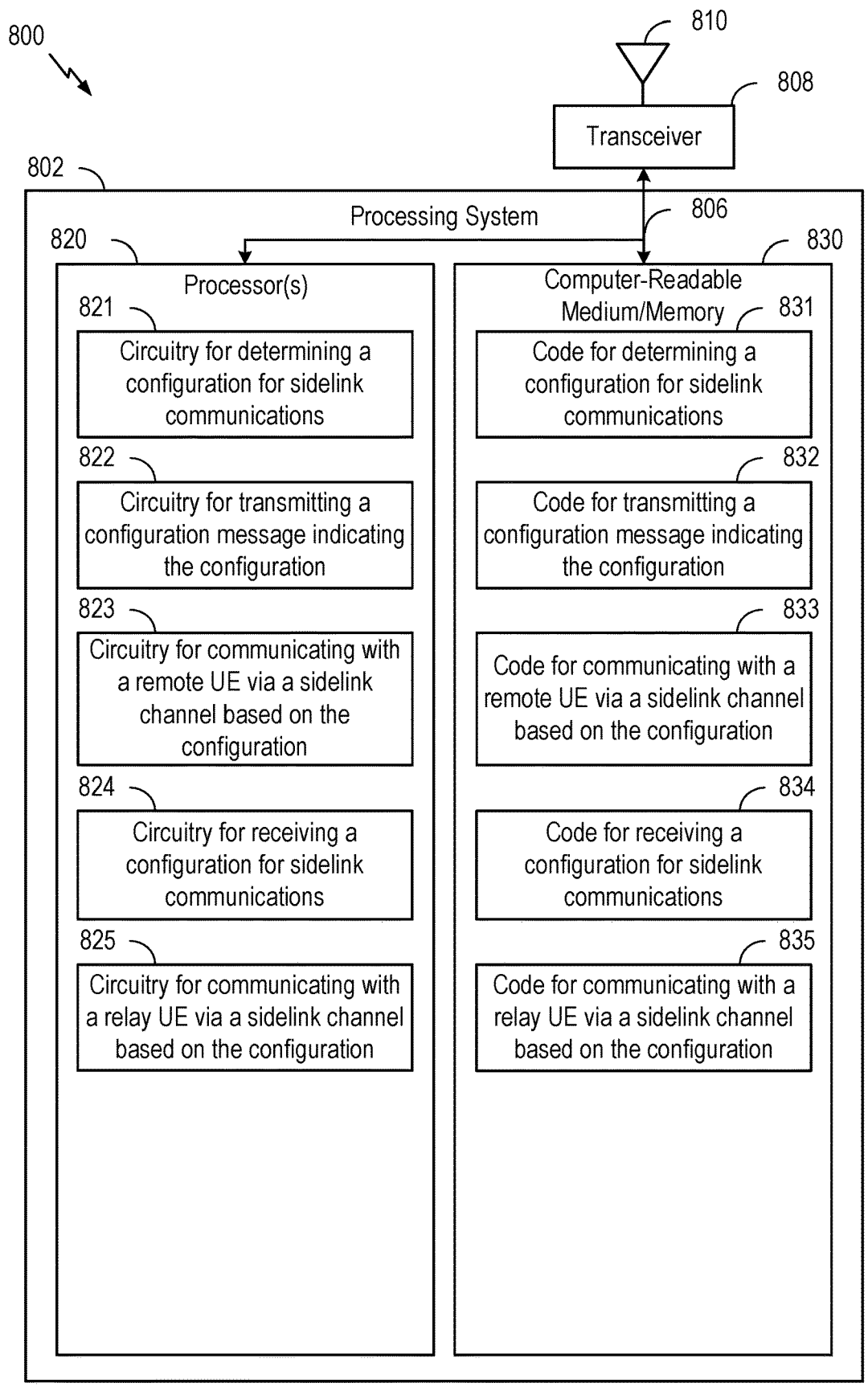
FIG. 8 depicts aspects of an example communications device.

FIG. 8 depicts an example communications device 800 that includes various components operable, configured, or adapted to perform operations for the techniques disclosed herein, such as the operations depicted and described with respect to FIGS. 7-8. In some examples, communication device 800 may be a user equipment 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 820 via a bus 806. In certain aspects, computer-readable medium/memory 820 is configured to store instructions (e.g., computer-executable code) that when executed by the one or more processors 820, cause the one or more processors 820 to perform the operations illustrated in FIGS. C-D, or other operations for performing the various techniques discussed herein for configure discontinuous reception for sidelink communications between a relay UE and a remote UE.

In the depicted example, computer-readable medium/memory 830 stores code 831 for determining a configuration for sidelink communications, code 832 for transmitting a configuration message indicating the configuration, code 833 for communicating with a remote UE via a sidelink channel based on the configuration, code 834 for receiving a configuration for sidelink communications, and code 835 for communicating with a relay UE via a sidelink channel based on the configuration.

In the depicted example, the one or more processors 820 include circuitry configured to implement the code stored in the computer-readable medium/memory 820, including circuitry 821 for determining a configuration for sidelink communications, circuitry 822 for transmitting a configuration message indicating the configuration, circuitry 823 for communicating with a remote UE via a sidelink channel based on the configuration, circuitry 824 for receiving a configuration for sidelink communications, and circuitry 825 for communicating with a relay UE via a sidelink channel based on the configuration.

Various components of communications device 800 may provide means for performing the methods described herein, including with respect to FIGS. 6-7.

In some examples, means for transmitting or sending (or means for outputting for transmission) may include the transceivers 254 and/or antenna(s) 252 of the user equipment 104 illustrated in FIG. 2 and/or transceiver 808 and antenna 810 of the communication device 800 in FIG. 8.

In some examples, means for receiving (or means for obtaining) may include the transceivers 254 and/or antenna(s) 252 of the user equipment 104 illustrated in FIG. 2 and/or transceiver 808 and antenna 810 of the communication device 800 in FIG. 8.

In some examples, means for determining may include various processing system components, such as: the one or more processors 820 in FIG. 8, or aspects of the user equipment 104 depicted in FIG. 2, including receive processor 258, transmit processor 264, TX MIMO processor 266, and/or controller/processor 280 (including sidelink communication component 281).

Notably, FIG. 8 is just use example, and many other examples and configurations of communication device 800 are possible.

EXAMPLE CLAUSES

Implementation examples are described in the following numbered clauses:

Clause 1: A method for wireless communications by a relay user equipment (UE), comprising: determining a configuration for sidelink discontinuous reception (DRX) communications between the relay UE and a first remote UE, the configuration including a transmission configuration for communications from the relay UE to the first remote UE and a reception configuration for communications from the first remote UE to the relay UE; transmitting, to the first remote UE, a configuration message indicating the configuration for sidelink DRX communications between the relay UE and the first remote UE; and communicating with the first remote UE via a sidelink channel based on the configuration.

Clause 2: The method of Clause 1, wherein the configuration message includes an indication that the configuration is determined by the relay UE for both transmission and reception at the relay UE.

Clause 3: The method of any one of Clauses 1 or 2, wherein the configuration message comprises a DRX configuration message.

Clause 4: The method of any one of Clauses 1 through 3, wherein determining the configuration for sidelink DRX communications is based on traffic and quality of service (QoS) flow information associated with the first remote UE.

Clause 5: The method of any one of Clauses 1 through 4, wherein the reception configuration for communications from the first remote UE to the relay UE comprises a transmission configuration for the first remote UE.

Clause 6: The method of any one of Clauses 1 through 5, further comprising: determining a second configuration for sidelink DRX communications between the relay UE and a second remote UE, wherein the second configuration for sidelink DRX communications between the relay UE and the second remote UE comprises a second DRX period; and indicating, to the first remote UE, information about the second DRX period as an overflow DRX period that can be used for communications between the relay UE and the first remote UE.

Clause 7: The method of Clause 6, wherein indicating information about the second DRX period as the overflow DRX period comprises indicating a priority level threshold for the first remote UE to use in determining when communications can be performed during the second DRX period.

Clause 8: The method of any one of Clauses 6 or 7, further comprising: terminating the second configuration for sidelink DRX communications between the relay UE and the second remote UE; and based on terminating the second configuration, indicating, to the first remote UE, that the overflow DRX period associated with the second DRX period is revoked.

Clause 9: The method of any one of Clauses 6 through 8, wherein the second DRX period is distinct from a first DRX period associated with the configuration for sidelink DRX communications between the relay UE and the first remote UE.

Clause 10: The method of any one of Clauses 6 through 9, wherein the processor is further configured to cause the apparatus to: communicate with the first remote UE during the second DRX period.

Clause 11: The method of any one of Clauses 1 through 10, wherein the configuration message is associated with a group of UEs including the first remote UE and is transmitted to the group of UEs via groupcast signaling.

Clause 12: The method of Clause 11, further comprising: assigning each respective UE in the group of UEs a temporary identifier for a unicast link between the respective UE and the relay UE.

Clause 13: The method of Clause 12, wherein the configuration includes a temporary identifier of the first remote UE to indicate that the configuration included in the configuration message is applicable to the first remote UE but not to other UEs in the group of UEs.

Clause 14: The method of any one of Clauses 1 through 13, wherein the relay UE and the first remote UE are connected with a network entity in radio resource control (RRC) connected mode.

Clause 15: The method of Clause 14, wherein determining the configuration for sidelink DRX communications comprises unpacking a container received from the network entity in a radio resource control (RRC) reconfiguration message.

Clause 16: A method for wireless communications by a remote user equipment (UE), comprising: receiving, from a relay UE, a configuration message indicating a configuration for sidelink discontinuous reception (DRX) communications between the remote UE and the relay UE, the configuration including a reception configuration for communications from the relay UE to the remote UE and a transmission configuration for communications from the remote UE to the relay UE; and communicating with the relay UE via a sidelink channel based on the configuration.

Clause 17: The method of Clause 16, wherein the configuration message includes an indication that the configuration is determined by the relay UE for both transmission and reception at the relay UE.

Clause 18: The method of any one of Clauses 16 or 17, wherein the configuration message comprises a DRX configuration message.

Clause 19: The method of any one of Clauses 16 through 18, further comprising: receiving, from the relay UE, information indicating a second DRX period serving as an overflow DRX period for communications between the relay UE and the remote UE when communications cannot be successfully performed in a first DRX period associated with the configuration for sidelink DRX communications between the remote UE and the relay UE; and communicating with the relay UE during the second DRX period.

Clause 20: The method of Clause 19, wherein the information indicating the second DRX period comprises an indication of a priority level threshold for use in determining when communications can be performed during the second DRX period.

Clause 21: The method of any one of Clauses 19 or 20, further comprising: receiving, from the relay UE, an indication that the overflow DRX period associated with the second DRX period is revoked; and communicating with the relay UE using the first DRX period but not the second DRX period based on receiving the indication.

Clause 22: The method of any one of Clauses 16 through 21, wherein the configuration message is associated with a group of UEs including the remote UE and is received from the relay UE via groupcast signaling.

Clause 23: The method of Clause 22, wherein each respective UE in the group of UEs is associated with a temporary identifier for a unicast link between the respective UE and the relay UE.

Clause 24: The method of Clause 23, wherein the configuration includes a temporary identifier of the remote UE to indicate that the configuration included in the configuration message is applicable to the remote UE but not to other UEs in the group of UEs.

Clause 25: The method of any one of Clauses 16 through 24, wherein the relay UE and the remote UE are connected with a network entity in radio resource control (RRC) connected mode.

Clause 26: The method of Clause 25, wherein the configuration message comprises a container in a radio resource control (RRC) reconfiguration message forwarded from the network entity to the remote UE via the relay UE.

Clause 27: An apparatus, comprising: a memory comprising executable instructions; one or more processors configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by one or more processors of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of configuring discontinuous reception on a sidelink connection between a relay user equipment (UE) and a remote UE in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications by a relay user equipment (UE), comprising:
   a memory having executable instructions stored thereon; and
   a processor configured to execute the executable instructions to cause the apparatus to:
      determine a first configuration for sidelink discontinuous reception (DRX) communications between the relay UE and a first remote UE, the first configuration including a transmission configuration for communications from the relay UE to the first remote UE and a reception configuration for communications from the first remote UE to the relay UE, wherein a first DRX period is associated with the first configuration for sidelink DRX communications between the relay UE and the first remote UE;
      transmit, to the first remote UE, a configuration message indicating the first configuration for sidelink DRX communications between the relay UE and the first remote UE;
      communicate with the first remote UE via a sidelink channel based on the first configuration,
      determine a second configuration for sidelink DRX communications between the relay UE and a second remote UE, wherein the second configuration for sidelink DRX communications between the relay UE and the second remote UE comprises a second DRX period; and
      indicate, to the first remote UE, information about the second DRX period as an overflow DRX period that can be used for communications between the relay UE and the first remote UE.

2. The apparatus of claim 1, wherein the configuration message includes an indication that the first configuration is determined by the relay UE for both transmission and reception at the relay UE.

3. The apparatus of claim 1, wherein the configuration message comprises a DRX configuration message.

4. The apparatus of claim 1, wherein the processor is configured to determine the first configuration for sidelink DRX communications based on traffic and quality of service (QoS) flow information associated with the first remote UE.

5. The apparatus of claim 1, wherein the reception configuration for communications from the first remote UE to the relay UE comprises a transmission configuration for the first remote UE.

6. The apparatus of claim 1, wherein the processor is configured to indicate information about the second DRX period as the overflow DRX period by indicating a priority level threshold for the first remote UE to use in determining when communications can be performed during the second DRX period.

7. The apparatus of claim 1, wherein the processor is further configured to cause the apparatus to:
   terminate the second configuration for sidelink DRX communications between the relay UE and the second remote UE; and
   based on terminating the second configuration, indicate, to the first remote UE, that the overflow DRX period associated with the second DRX period is revoked.

8. The apparatus of claim 1, wherein the second DRX period is distinct from the first DRX period associated with the first configuration for sidelink DRX communications between the relay UE and the first remote UE.

9. The apparatus of claim 1, wherein the processor is further configured to cause the apparatus to:
   communicate with the first remote UE during the second DRX period.

10. The apparatus of claim 1, wherein the configuration message is associated with a group of UEs including the first remote UE and is transmitted to the group of UEs via groupcast signaling.

11. The apparatus of claim 10, wherein the processor is further configured to cause the apparatus to:
   assign each respective UE in the group of UEs a temporary identifier for a unicast link between the respective UE and the relay UE.

12. The apparatus of claim 11, wherein the first configuration includes a temporary identifier of the first remote UE to indicate that the first configuration included in the configuration message is applicable to the first remote UE but not to other UEs in the group of UEs.

13. The apparatus of claim 1, wherein the relay UE and the first remote UE are connected with a network entity in radio resource control (RRC) connected mode.

14. The apparatus of claim 13, wherein the processor is configured to determine the first configuration for sidelink DRX communications by unpacking a container received from the network entity in a radio resource control (RRC) reconfiguration message.

15. The apparatus of claim 1, wherein the overflow DRX period comprises a period usable for communications between the relay UE and the first remote UE when a length of a transmission between the relay UE and the first remote UE exceeds a duration of the first DRX period.

16. An apparatus for wireless communications by a remote user equipment (UE), comprising:
    a memory having executable instructions stored thereon; and
    a processor configured to execute the executable instructions to cause the apparatus to:
        receive, from a relay UE, a configuration message indicating a configuration for sidelink discontinuous reception (DRX) communications between the remote UE and the relay UE, the configuration including a reception configuration for communications from the relay UE to the remote UE and a transmission configuration for communications from the remote UE to the relay UE; and
        communicate with the relay UE via a sidelink channel based on the configuration,
        receive, from the relay UE, information indicating a second discontinuous reception (DRX) period serving as an overflow DRX period for communications between the relay UE and the remote UE when communications cannot be successfully performed in a first DRX period associated with the configuration for sidelink DRX communications between the remote UE and the relay UE; and
        communicate with the relay UE during the second DRX period.

17. The apparatus of claim 16, wherein the configuration message includes an indication that the configuration is determined by the relay UE for both transmission and reception at the relay UE.

18. The apparatus of claim 16, wherein the configuration message comprises a DRX configuration message.

19. The apparatus of claim 16, wherein the information indicating the second DRX period comprises an indication of a priority level threshold for use in determining when communications can be performed during the second DRX period.

20. The apparatus of claim 16, wherein the processor is further configured to cause the apparatus to:
    receive, from the relay UE, an indication that the overflow DRX period associated with the second DRX period is revoked; and
    communicate with the relay UE using the first DRX period but not the second DRX period based on receiving the indication.

21. The apparatus of claim 16, wherein the configuration message is associated with a group of UEs including the remote UE and is received from the relay UE via groupcast signaling.

22. The apparatus of claim 21, wherein each respective UE in the group of UEs is associated with a temporary identifier for a unicast link between the respective UE and the relay UE.

23. The apparatus of claim 22, wherein the configuration includes a temporary identifier of the remote UE to indicate that the configuration included in the configuration message is applicable to the remote UE but not to other UEs in the group of UEs.

24. The apparatus of claim 16, wherein the relay UE and the remote UE are connected with a network entity in radio resource control (RRC) connected mode.

25. The apparatus of claim 24, wherein the configuration message comprises a container in a radio resource control (RRC) reconfiguration message forwarded from the network entity to the remote UE via the relay UE.

26. The apparatus of claim 16, wherein the overflow DRX period comprises a period usable for communications between the relay UE and the remote UE when a length of a transmission between the relay UE and the remote UE exceeds a duration of the first DRX period.

27. A method for wireless communications by a relay user equipment (UE), comprising:
    determining a first configuration for sidelink discontinuous reception (DRX) communications between the relay UE and a first remote UE, the first configuration including a transmission configuration for communications from the relay UE to the first remote UE and a reception configuration for communications from the first remote UE to the relay UE, wherein a first DRX period is associated with the first configuration for sidelink DRX communications between the relay UE and the first remote UE;
    transmitting, to the first remote UE, a configuration message indicating the first configuration for sidelink DRX communications between the relay UE and the first remote UE;
    communicating with the first remote UE via a sidelink channel based on the first configuration;
    determining a second configuration for sidelink DRX communications between the relay UE and a second remote UE, wherein the second configuration for sidelink DRX communications between the relay UE and the second remote UE comprises a second DRX period; and
    indicating, to the first remote UE, information about the second DRX period as an overflow DRX period that can be used for communications between the relay UE and the first remote UE.

28. A method for wireless communications by a remote user equipment (UE), comprising:
    receiving, from a relay UE, a configuration message indicating a configuration for sidelink discontinuous reception (DRX) communications between the remote UE and the relay UE, the configuration including a reception configuration for communications from the relay UE to the remote UE and a transmission configuration for communications from the remote UE to the relay UE;
    communicating with the relay UE via a sidelink channel based on the configuration;
    receiving, from the relay UE, information indicating a second DRX period serving as an overflow DRX period for communications between the relay UE and the remote UE when communications cannot be successfully performed in a first DRX period associated with the configuration for sidelink DRX communications between the remote UE and the relay UE; and
    communicating with the relay UE during the second DRX period.

* * * * *